United States Patent [19]

Klöker et al.

[11] Patent Number: 4,961,179

[45] Date of Patent: Oct. 2, 1990

[54] CURABLE REACTION COMPOSITIONS FOR PRODUCING DATA CARRIERS

[75] Inventors: Werner Klöker; Dieter Freitag, both of Krefeld; Walter Uerdingen, Leverkusen; Bernhard Hess, Moers; Helmut Schmid, Krefeld, all of Fed. Rep. of Germany

[73] Assignee: Bayer Aktiengesellschaft, Leverkusen, Fed. Rep. of Germany

[21] Appl. No.: 72,395

[22] Filed: Jul. 13, 1987

[30] Foreign Application Priority Data

Jul. 25, 1986 [DE] Fed. Rep. of Germany ....... 3625169

[51] Int. Cl.$^5$ .................. G11B 5/62; C08F 228/04
[52] U.S. Cl. ................... 369/288; 526/289; 526/292.3; 526/313; 526/320
[58] Field of Search ................ 369/288, 284; 428/65

[56] References Cited

U.S. PATENT DOCUMENTS

| | | | |
|---|---|---|---|
| 4,235,986 | 11/1980 | Catena | 526/320 |
| 4,668,550 | 5/1987 | Tajima | 428/65 |
| 4,729,938 | 3/1988 | Tajima | 430/272 |
| 4,777,632 | 10/1988 | Wenzel | 369/288 |

OTHER PUBLICATIONS

Patent Abstracts of Japan, vol. 7, No. 30 (P-173) [1175], Feb. 5, 1983.

Primary Examiner—Christopher Henderson
Attorney, Agent, or Firm—Connolly and Hutz

[57] ABSTRACT

Reaction compositions of selected make-up result after curing in non-meltable polymers of high mechanical stability and low water uptake. Owing to the low birefringence of the cured products, these compositions are highly suitable for preparing carrier materials for optically and magnetically readable and/or writable data carriers.

6 Claims, No Drawings

CURABLE REACTION COMPOSITIONS FOR PRODUCING DATA CARRIERS

Proven state of the art materials for use as carrier material for layers bearing magnetically readable and writeable audio, Video and DP data are thermoplastics, such as saturated polyesters, for example polyethylene terephthalate or cocondensates thereof, for example with butane-1,4-diol, polyvinyl chloride and vinyl chloride copolymers, among others, in the form of tapes, films and discs.

In the case of optical, in particular laser-readable systems, at present only discs are used as storage media. In the case of video (laser vision) discs (diameter about 30 cm), the carrier substrate is made of glass or polymethyl methacrylate.

Interesting materials described for use as substrate materials for optical data carriers are polyvinyl chloride and polycarbonate (van den Bruck and others, Journal of Radiation Curing, January 1984, pages 2 et seq.; Kunststoffjournal 11/1982, pages 6 et seq., Count 2).

Other materials described for use in data storage are butyl methacrylate/methacrylic acid copolymers (Forestry Ministry Paper, SU 1046736 of 03.06.82/07.10.83;

terpolymers of alkyl methacrylate, styrene and N-vinylphenyl-n-alkyl- or arylthio-urea, Kish University, SU 873,269 of 30.11.79/15.10.81; thermoplastic compositions which contain poly-N-vinylcarbazole, trinitrofluorenone, styrene-butadiene copolymers (M.S. Burakina, SU 667,950 of 05.09.77/25.06.79);

polymers based on cyclohexyl methacrylate, JP-A-57-186,241 of 11.05.81/16.11.82.

Copolymers of butyl methacrylate and styrene for data layers which are applied for example to metallic surfaces from a solution in benzene (C. V. Gurasch and others SU 391,597 of 26.04.71/22.11.73);

in this context a mention must also be given to DE-OS (German Published Specification) 2,744,479, according to which the data carrier layer is applied by radiative polymerization of, for example, 2-ethylhexyl acrylate, 1,1,1-trimethylolpropane triacrylate onto carriers, for example films made of polyvinyl chloride, polycarbonate, polyester, cellulose ester etc.

Polymers are at present of economic importance and interest for use as substrates for storage discs in several technologies:

1. Non-erasable optical memories (Read -Only -Memories ROMs) or Optical - Read - Only Memories (OROMs)

1.1 In the course of manufacture, a mould embosses digital data, for example in the form of pits, which are optically, for example by means of laser, read only. This process has achieved great technological and economic importance in the audio and video sector in the form of compact discs (CDs) and laser vision. Such digital data carriers are called DC-ROMs.

1.2 In the case of write once ROMs or direct read after write, DRAW for short, systems, a transparent substrate disc (made of glass or polymer material) is coated for example with a thermoplastic layer, with dyestuffs or with a low-melting alloy, based on selenium, tellurium, bismuth or the like or organic metal complex compounds, and a laser is used to create data spots (holes, bubbles, recesses) by local melting and shrinking of the layer which in turn are laser-readable on account of differences in reflectance or scatter.

2. Erasable Direct Read After Write, E-DRAW or 0 (optical)-E-DRAW for short, systems consist of a polymer or glass disc which is provided with a thin (for example $\leq 10$ μm thick) data-storing layer. This layer can consist of:

2.1 substances which undergo a phase change (PC) under local high-energy laser irradiation. Such substances are, inter alia, selenium, tellurium, antimony, arsenic compounds. The information produced by the action of a laser is again laser-readable as a consequence of varying reflection behaviour. These systems are called "PC-E-DRAW" systems for short.

2.2 Ferromagnetic alloys having a low Curie point, for example those from the rare earth/transition metals series, such as Tb-Ge-Fe. Read off is effected by utilizing the rotation of the direction of vibration of linear polarized laser radiation (Kerr and/or Faraday effect).

In writing to the disc, a high-energy laser pulse together with the action of a magnetic field serves to reverse the magnetization of the storage layer and, after cooling down to below the Curie temperature, to fix the information magnetically. This system or process is called the magnetooptical (MO-E-DRAW) system for short.

Laser-readable, approximately 1.2 mm thick audio discs (compact discs, CD-ROMs) are at present manufactured as copies by the "standard" injection-moulding process and by the injection/compression moulding process from soft-flow polycarbonate (H. Höser, Kunststoffjournal 6/1985, pages 26 et seq., Plastverarbeiter volume 36, 1985, No. 3, pages 10 et seq.) Therein the digital information carriers are fixed in the injection mould in the form of 0.2–1 mm thick metal templates.

However, the materials and processing methods described have decisive disadvantages which are no longer acceptable given the rising demands from the electronics industry:

1. Glass as a carrier material is heavy and fragile, and the corresponding qualitatively high-grade discs are difficult to produce expensively.
2. It is true that discs, even with data, are simple to manufacture by injection-moulding from polymethyl methacrylate and butyl methacrylate copolymers; however, the significant problem is the water uptake (1.5–3% by weight), causing swelling and attendant stresses, and also distortion and changes in the birefringence. This causes severe problems on the laser-read playback — not only in the case of CD-ROMs.
3. Another disadvantage is the low heat distortion resistance and low glass transition temperature of polymethyl methacrylate (Tg: ca. 100–110° C.), butyl methacrylate copolymers (Tg: < 100° C.) and in particular of PVC (Tg: about 80° C.).
4. PVC further has the disadvantage of a low transmittance, for example about 75–85%, in respect of the wavelength of the laser beam.
5. Further disadvantages of laser-readable data discs (CD-ROMs) produced in a one-shot process from thermoplastics and provided with data (pits) for audio, video and DP can be: difficulties in the manufacture of replicas owing to unfavourable to incomplete reproducibility of the data pits, caused by the relatively viscous melts;
6. the fact that the information pits do not last long at elevated temperatures (for example through being subjected to relatively high laser energy for an excessively long time, through heat treatment for removing stresses by heating, and also through wear and tear on the mould as a consequence of friction from the viscous thermoplastic melt during injection at high temperatures, for example 200° to 360° C.).

The hitherto described state of the art is based on glass or thermoplastic products. JP-A-59 - 22,248 Sumitomo Bakelite Co., Ltd., of 28.07.82/04.02.84 claims transparent carrier materials for optical memories, which are produced from a liquid epoxy resin in a mould and are subsequently provided with an information-storing layer not only analogously to the above-described DRAW and E-DRAW systems but also in the case of CD-ROM copies. The ideally cycloaliphatic epoxy resin, which has been combined with acid anhydride and a curing accelerant of the imidazole type, must be left to cure at 100° C. in a mould provided with a release agent for 5 hours. Such long mould occupation times are technically and economically unacceptable for mass production.

The person skilled in the art knows that relatively highly crosslinked polymers have a greater volume contraction than most polyaddition systems, in particular epoxy resins. This volume contraction can, for example be responsible for low strength, inter alia on account of high internal stresses and, resulting therefrom, higher birefringences. Owing to the relatively high volume contraction in the case of transparent systems, which can appear even at a relatively early stage of curing, good reproductions of the information pits were generally not to be expected in the production of information-bearing disc copies (CD-ROMs), in particular in the case of unsaturated polyester, acrylate and methacrylate systems.

It has now been found, surprisingly, that, using a selection of reaction compositions based on the unsaturated compounds mentioned, the transparent substrate and copy discs described (containing data in the form of pits (CD-ROMs)) can be manufactured in high quality and demoulded by curing with peroxides and, optionally, accelerants and, optionally, promotors and inhibitors and/or radiation, preferably UV radiation, in the presence of initiators in the temperature range between 15° and 100° C. in less than 20 minutes. These polymerization products are distinguished by low to very low birefringence (< 20 nm/mm, preferably <5 nm/mm to <1 nm/mm), low water uptake (<0.9 preferably <0.5% by weight), high mechanical stability (flexural modulus of elasticity >2300 N/mm$^2$, preferably >3000 N/mm$^2$, in particular >3500 N/mm$^2$) and in particular by excellent reproduction of the informationbearing surface coupled with a high heat distortion resistance (Tg>140° C., preferable Tg>160° C.). These substrate and copy discs thus do not exhibit the abovementioned disadvantages of the thermoplastics described and of the epoxy resin system at all or only to a very much reduced extent. Compared with the epoxy resin system, this is true in particular of the production speed, slow because of long mould occupation times, and the need to use high temperatures.

The reaction compositions according to the present invention consist of

A. 30 to 90 — preferably 40 to 80 — parts by weight of ethylenically diunsaturated polymerizable compounds of the formula I — preferably bisphenol A bismethacrylate and bisphenol F bismethacrylate, optionally in admixture with compounds of the formula II, B. 70 to 10 — preferably 60 to 20 — parts by weight of copolymerizable compounds III from the series p-methylstyrene, tert.-butylstyrenes, divinylbenzenes, vinylnaphthalenes, vinylanthracenes, the total amount of A and B adding up to 100 parts by weight.

To prepare these polymers (curing) preference is given to using reaction-producing agents and optionally auxiliaries:

C. 0.01 to 10 — preferably 0.1 to 4 — parts by weight of at least one polymerization initiator and optionally D. 0.00001 to 0.5 — preferably 0.00002 to 0.1 — parts by weight of at least one accelerant and optionally E. 0.001 to 2 — preferably 0.001 to 1 — parts by weight of at least one promotor and optionally F. 0.00001 to 0.5 — preferably 0.0001 to 0.01 — parts by weight of at least one inhibitor.

If not only compound I but also compound II is used as component A, the amount of I is in general at least 20, preferably at least 40% by weight, of II.

Compounds of the

FORMULA I

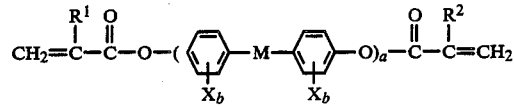

a=1-2, preferably 1,
b=0-4, preferably 0-2,

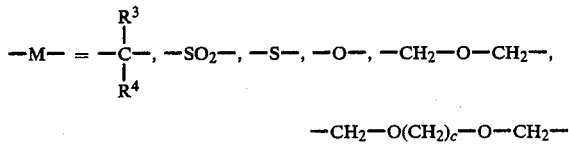

or a single bond,
c=2-6,
X—=—CH$_3$, —halogen (except I),
R$^1$, R$^2$—=—H, —CH$_3$, —C$_2$H$_5$; R$^3$—, R$^4$—=R$^1$—,

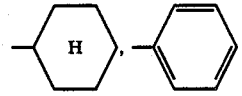

FORMULA II

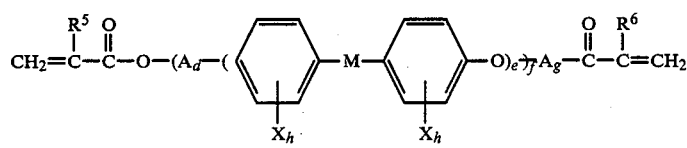

d=1-3, preferably 1-2,
 e=1-2, preferably 1,
 f=1-5, preferably 1, 3, 5,
 g=1-3, preferably 1-2,
 h=0-4,
 X—=—CH—$_{CH3}$, —halogen (except I)

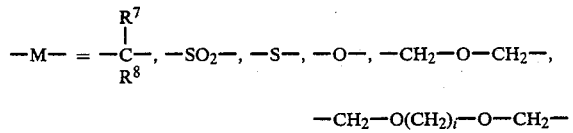

—CH$_2$—O(CH$_2$)$_i$—O—CH$_2$— or a single bond with the proviso that in the case of f>1 in the formula II M can be different,
 i=2-6,

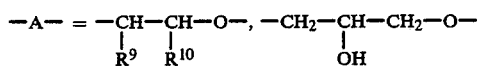

R$^5$—, R$^6$—, R$^9$—, R$^{10}$=—H, OCH$_3$ with the proviso that
 R$^9$ and R$^{10}$ cannot be —CH$_3$ at the same time,
 R$^7$—, R$^8$—=—H, —CH$_3$, —C$_2$H$_5$, and in addition
 R$^8$ =

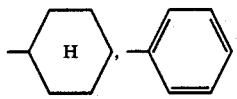

Preferred reaction compositions are those on the basis of

FORMULA I

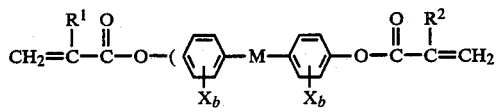

b = 0-2

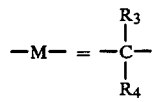

X—=—CH$_3$, —Cl
R$^1$, R$^2$—, R$^3$—, R$^4$—=—H, —CH$_3$

FORMULA II

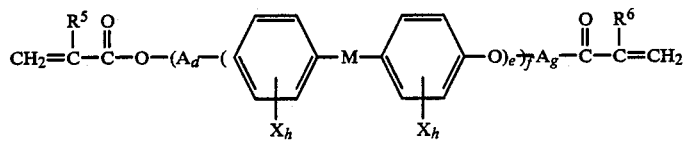

d=1-2,
 e=1-2, preferably 1,
 f=1, 3,
 g=1-2,
 h=0-2,

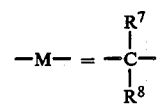

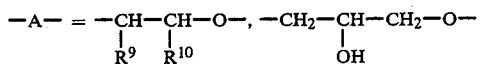

R$^5$—, R$^6$—, R$^7$—, R$^8$, R$^9$—, R$^{10}$—=—H, —CH$_3$

Particularly preferred reaction compositions are those on the basis of

FORMULA I

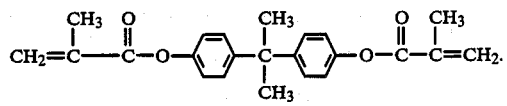

FORMULA II

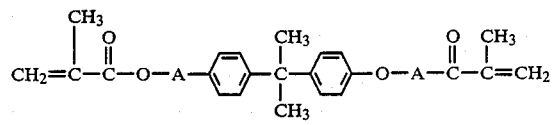

—A—=—CH$_2$—CH$_2$—O—

The preparation of the polymers is effected in a known manner by polymerization at very low temperatures, but preferably by radiation, for example by UV radiation, preferably at room temperature, but at not more than 100° C. Optionally, the residual polymerization, in particular in the case of polymers having relatively high glass transition temperatures, can be effected by means of a thermal aftertreatment above 50° C., but at no more than a temperature of T =Tg 20° C., preferably at 80° —100° C.

Compounds of the formula I for the purposes of this invention are acrylic esters and preferably methacrylic acid esters of bisphenols, for example sulphonyl bisphenol, thionyl bisphenol, 4,4'-dihydroxydiphenyl, 4,4'-dihydroxydiphenyl ether, in particular bisphenol A, bisphenol F and mixtures thereof.

For the purposes of this invention, compounds of the formula II are acrylic esters and preferably methacrylic esters of ethoxylation and/or propoxylation products of bisphenols, for example sulphonyl bisphenol, thionyl bisphenol, preferably bisphenols A and F or mixtures thereof, with a degree of ethoxylation and/or propoxylation of 1-3, preferably 1-2. Furthermore, the substances of the formula I are acrylates and preferably methacrylates of bisglycidyl ethers of the bisphenols mentioned or mixtures thereof, preferably of bisphenols A and F, and the reaction products of bisphenol bisglycidyl ethers and identical and/or different bisphenols, molar ratio (2:1) to (5:4), preferably 2:1, preferably bisphenols A and F, and their ring-substituted derivatives such as tetramethyl- and/or tetrachlorobisphenols A and F.

The monoesters produced as byproducts in the industrial production of compounds II are generally harmless with respect to their use according to the invention.

Polymerization initiators for the purposes of this invention are 1. for radiation curing, preferably with UV radiation: for example benzophenone, 1-hydroxycyclohexyl phenyl ketone, 2-methyl-1-4-(methylthio)phenyl-2-morpholinopro-pan-1-one, benzoin ethers, preferably benzoin isopropyl and isobutyl ether, benzil diketals, preferably benzil dimethyl ketal, and mixtures of the compounds mentioned;
2. for free radical curing with organic peroxides and-/or silyl ethers of benzpinacol and/or radiation/-peroxide mixed curing systems: diacyl peroxides, peroxidicarbonates, peresters, perketals, dialkyl peroxides, ketone peroxides, hydroperoxides, for example: bis-(2,4-dichlorobenzoyl) peroxide, dilauroyl peroxide, dibenzoyl peroxide, di-2-ethylhexyl peroxydicarbonate, diisopropyl peroxydicarbonate, dicyclohexyl peroxydicarbonate, bis(4-tert.-butylcyclohexyl) peroxydicarbonate, tert.-butyl perpivalate, tert.-butyl per-2-ethylhexanoate, tert.-butyl per-3,5,5-trimethylhexanoate, tert.-butyl perbenzoate, tert.-butyl permaleate, 1,1-bis(tert.-butylperoxy)3,3,5-trimethylcyclohexane, 1,1-bis(-tert.-butylperoxy)cyclohexane, 2,2-bis(tert.-butylperoxy)butane, n-butyl 4,4-bis(tert.-butylperoxy)-valerate, ethyl 3,3-bis(tert.-butylperoxy)butyrate, dicumyl peroxide, tert.-butyl cumyl peroxide, bis(-tert.-butylperoxyisopropyl)benzene, 2,5-di-methylhexane-2,5-di-tert.-butyl peroxide, di-tert.-butyl peroxide, methyl isobutyl ketone peroxide, methyl ethyl ketone peroxide, acetylactone peroxide, cyclohexanone peroxide, cumene hydroperoxide, t-butyl hydroperoxide and mixtures of the compounds mentioned.

For the purposes of this invention, accelerants are inorganic, preferably organic salts and complex compounds of metals, preferably of cobalt and vanadium, which are soluble in the reaction compositions, for example cobalt ocatoate, cobalt naphthenate, cobalt acetylacetoate, vanadyl acetylacetonate, vanadyl salts of partial phosphoric acid esters, pyro- or polyphosphoric acid esters, vanadyl octoate, vanadyl acetate, vanadyl p-toluenesulphonate; and also amines, preferably tertiary alkylarylamines, for example N,N-dimethylaniline, N,N-diethylaniline, N,N-dimethyl-p-toluidine, N,N-bis-(β-hydroxyethyl)p-toluidine, N,N-bis-(8-hydroxypropyl)ptoluidine, N,N-bis-(8-hydroxyethyl)-p-toluidine phthalate, N,N-bis-(8-hydroxypropyl)-p-toluidine adipate (as described in DE-OS (German Published Specification) 1,943,954), tertiary amines of formula I as described in DE-OS (German Published Specification) 3,202,090, in which $R_3$, $R_5$=—H and $R_4$=—CH$_3$ (p-toluidine derivative), tertiary amine of the formula 1 as described in DE-OS (German Published Specification) 3,202,090 in which $R_4$ and $R_5$ are methyl groups (xylidine derivative), tertiary arylamine type in mixture with N,N-bis-(8-hydroxyethyl)-m-chloraniline (ratio 1:1 to 6:1).

For the purposes of this invention, promotors are for curings with accelerants based on cobalt compounds the abovementioned amines, preferably N,N-dimethylaniline, N,N-diethylaniline, N,N-dimethyl-p-toluidine, N,N-bis-β-hydroxyethyl- and/or -propyl-p-toluidine and/or esters thereof, for example with adipic acid, phthalic acids, monocarboxylic acids ($C_2$-$C_{10}$).

Promotors for vanadium compounds are: thiols and thiocarboxylic acid esters, preferably thioglycolic acid esters, as described for example in DE-AS (German Published Specification) 2,025,410.

Inhibitors for the purposes of this invention are: benzoquinone, toluquinone, naphthoquinones, trimethybenzoquinone, mono- and di-tertiary-butylbenzoquinones and/or hydroquinones thereof, preferably hydroquinone, toluhydroquinone, 1,4-naphthohydroquinone, pyrocatechols — preferably mono— and/or di-tert.-butyl-pyrocatechols — as well as their monoalkyl ethers, furthermore chloranil and soluble copper salts and/or complexes, for example copper naphthenate, copper octoate, copper acetylacetonate, copper(I) chloride/phosphite complexes, and mixtures of the compounds mentioned.

The reaction compositions — depending on the nature and the amount of the components — can be cured at temperatures of 10 to 100, preferably 20° to 90°, C.

Data carrier/carrier materials are those which

I. incorporate information (for example in pits), or
II. contain the information embedded in the form of sensible substances (for example dyestuffs), or
III. have been covered with an information layer (as represented for example by selenium-tellurium compounds and alloys and alloys and compounds having a low Curie point).

The carrier materials can be self-supporting or non-self-supporting, non-self-supporting materials being predominantly interlayers (for example on glass, thermoplastics or thermosets).

EXAMPLES

General preparation and test conditions

1. Mould construction 2 silicate (window) glass panes (200 mm × 270 mm × 3 mm) are spaced apart by means of an approximately 4 mm (round cross-section) or 1 mm (rectangular cross-section) thick flexible PVC sealing ribbon along 2 long and one short side of the panes. Along these sides the combination is held in place by means of three spring steel brackets (angular, U-shaped cross-section, length of brackets about 210 mm).

2. Release agent

Soya lecithin, 5% strength in xylene

3. Curing 3.1 Temperature: in general room temperature (23° C.), unless otherwise stated.

3.2 Curing method: continuous or interval irradiation peroxides, and accelerants and optionally promotors and optionally inhibitors; upright mould.

3.3 Radiation source: 4 fluorescent tubes, model TKL 40 W/09, Philips.

3.4 Distance of fluorescent tubes from mould: about 4.5 cm 3.5 Heat treatment: in general overnight at 90° C.; cooling in hot cabinet to about 30° C.; thereafter de-moulding (unless otherwise stated).

4. Birefringence or specific phase difference in linear polarized light

Disc thickness: 0.1 cm
Measuring instrument: polarized microscope

Measuring direction: $M_1$, i.e. the measuring beam passes only perpendicularly through the cast plate (perpendicularly to the direction of casting)

Visual appearance: Between two polarizing films rotated by 90°.

5. Water uptake

In accordance with ISO/R62, DIN 53,495: disc thickness: 0.1 cm; after 50 days (unless otherwise stated).

6. Glass transition temperature (Tg)

6.1 Dynamic glass transition temperature (dyn. Tg) in accordance with DIN 53,455: test specimen: flat rod (60 mm × 10 mm × 1 mm).

6.2 Glass transition temperature by differential thermoanalysis (Tg by DTA).

Legend to Examples

| | |
|---|---|
| B-A-BMA | = bisphenol-A bismethacrylate |
| HEB-A-BMA | = (4,4′-bis(β-hydroxyethyl)-bisphenol A) bismethacrylate |

| Example | Composition (in moles) | Birefringence $M_1$ [nm/mm] | Water uptake [% by weight] | Tg [°C.] | Flexural modulus of elasticity [N/mm²] |
|---|---|---|---|---|---|
| 1 | B-A-BMA HEB-A-BMA p-methylstyrene 1:1:3 | 3 | 0.42 | 194 (dyn.) | 3350 |
| 2 | B-A-BMA HEB-A-BMA divinylbenzene 0.5:0.8:3 | 1 | 0.25 | 169 (DTA) | 3200 |
| 3 | B-A-BMA HEB-A-BMA tert.-butylstyrene 0.5:0.8:3 | 0 | 0.30 | 175 (dyn.) | 3068 |
| 4 | B-A-BMA HEB-A-BMA tert.-butylstyrene divinylbenzene 0.5:0.8:2:1 | 0 | 0.28 | 175 (dyn.) | 3040 |

EXAMPLES 1–4

Initiator: 0.3% by weight of benzil dimethyl ketal, relative to reaction composition.

We claim:

1. A data carrier comprising a curable reaction composition containing

A. 30 to 90 parts by weight of polymerizable compounds of the formula

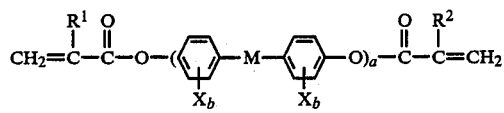

(I)

wherein

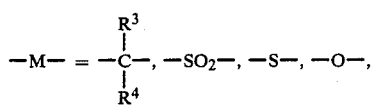

-continued $-CH_2-O-CH_2-$, $-CH_2-O(CH_2)_c-O-CH_2-$, single bond $X- = -CH_3$, -halogen (except I)

$R^1-$, $R^2- = -H, -CH_3, -C_2H_5$;

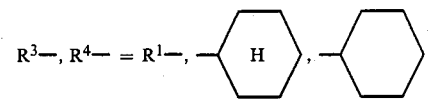

$a = 1-2$, $b = 0-4$, $c = 2-6$ and optionally of the formula

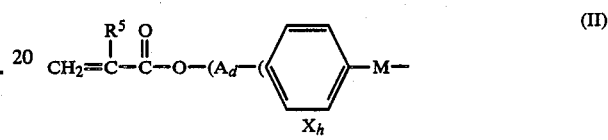

(II)

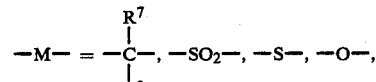

wherein $X- = -CH_3$, -halogen (except I)

$-M- = -\underset{R^8}{\overset{R^7}{\underset{|}{\overset{|}{C}}}}-$, $-SO_2-$, $-S-$, $-O-$, $-CH_2-O-CH_2-$, $-CH_2-O(CH_2)_f-O-CH_2$ single bond

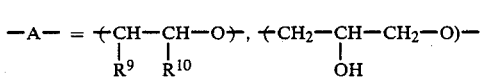

$R^5-$, $R^6-$, $R^9-$, $R^{10}=-H$, $-CH$ with the proviso that $R^9$ and $R^{10}$ cannot be at the same time $CH_3$,
$R^7-$, $R^8---R^5$, $-C_2H_5$, in addition $R^8-=$ 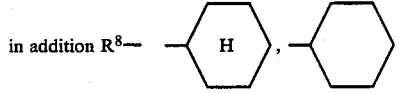

$d = 1-3$, $e = 1-2$, $f = 1-5$, $g = 1-3$, $h = 0-4$ $i = 2-6$

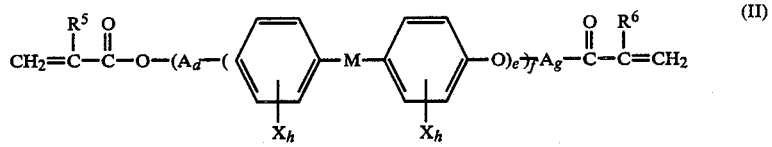

wherein, if A is a mixture of compounds I and II, the amount of I is at least 20 % by weight of II so that the sum of I and II is 30 to 90 parts by weight and B. 70 to 10 parts by weight of copolymerizable compounds III of the series P-methylstyrene, tert.-butylstyrenes, divinylbenzenes, vinylnaphthalenes, vinylanthracenes, the total amount of components A and B adding up to 100 parts by weight,
wherein said carrier is readable, writable or both by either optical or magnetic means or both.

2. A data carrier according to claim 1, characterized in that the reaction compositions contain 40 to 80 parts by weight of A and 60 to 20 parts by weight of B, the total A+B adding up to 100 parts by weight.

3. An optical carrier comprising a curable reaction composition containing

A. 30 to 90 parts by weight of polymerizable compounds of the formula

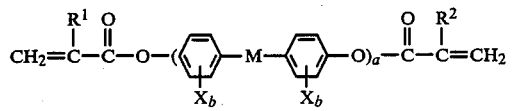  (I)

wherein

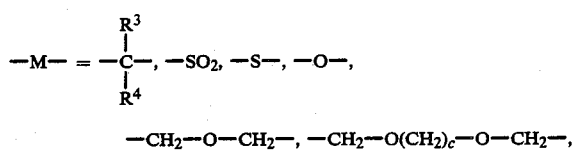

$-CH_2-O-CH_2-$, $-CH_2-O(CH_2)_c-O-CH_2-$, single bond $X-=-CH_3$, -halogen (except I)
$R^1-$, $R^2-=-H$, $-CH_3$, $-C_2H_5$;

-continued $R^3-$, $R^4-$, $=R^1=$, 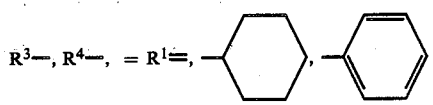

$a = 1-2$,
$b = 0-4$,
$c = 2-6$ and optionally of the formula

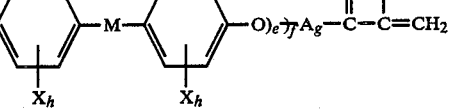 (II)

wherein $X-=-CH_3$, -halogen (except I)

$-M-= \overset{R^7}{\underset{R^8}{-C-}}$, $-SO_2-$, $-S-$, $-O-$, $-CH_2-O-CH_2-$, $-CH_2-O(CH_2)_f-O-CH_2$, single bond

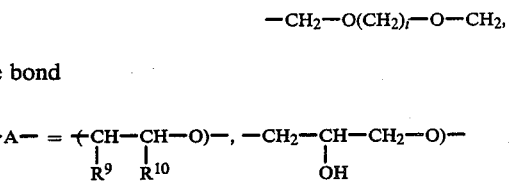

$R^5-$, $R^9-$, $R^9-$, $R^{10}=-H$, $-CH_3$ with the proviso that $R^9$ and $R^{10}$ cannot be at the same time $CH_3$,
$R^7-$, $R^8-=R^5-$, $-C_2H_5$, in addition $R^8=$ 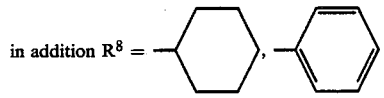

$d = 1-3$,
$e = 1-2$,
$f = 1-5$,
$g = 1-3$,
$h = 0-4$
$i = 2-6$

B. 70 to 10 parts by weight of copolymerizable compounds III of the series p-methylstyrene, tert.-butylstyrenes, divinylbenzenes, vinylnaphthalenes, vinylanthracenes, the total amount of components A and B adding up to 100 parts by weight.

4. An optical carrier according to claim 3 wherein the curable reaction composition contains 40 to 80 parts by weight of A and 60 to 20 parts by weight B.

5. A data carrier according to claim 1 wherein a=1 and b=0-2.

6. A data carrier according to claim 1 wherein e=1, f=1, 3 or 5 and g=1-2.

* * * * *